Feb. 4, 1964     B. K. GREGORY     3,120,248
PROCESS OF ADDING SMALL QUANTITIES OF MATERIAL
Filed Oct. 19, 1960
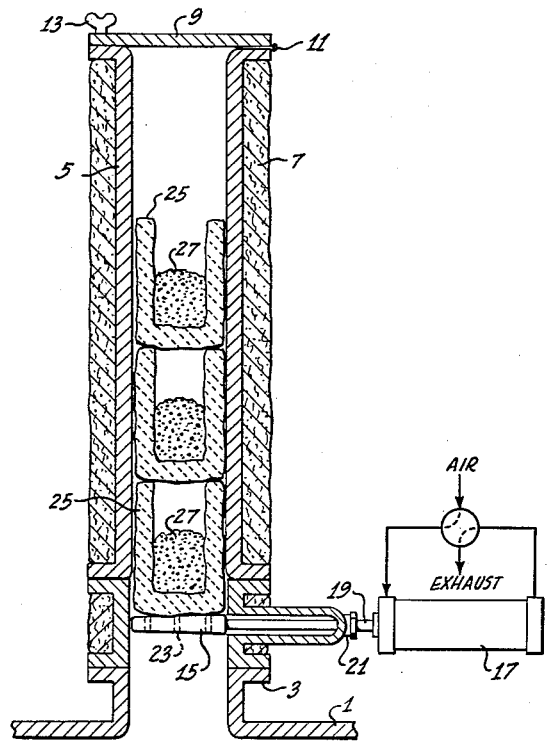
INVENTOR:
BOB K. GREGORY
BY
ATTORNEYS : 3,120,248
Patented Feb. 4, 1964

3,120,248
PROCESS OF ADDING SMALL QUANTITIES OF MATERIAL
Bob K. Gregory, San Jose, Calif., assignor to United Aircraft Corporation, a corporation of Delaware
Filed Oct. 19, 1960, Ser. No. 63,561
1 Claim. (Cl. 141—1)

This invention relates to a method and apparatus for adding small quantities of material to a large quantity of material such as in a batch or continuous mixer. The invention is particularly applicable to situations wherein a very small quantity of a dry powdery material or viscous material must be added to a batch.

In normal mixing operations, if one of the materials to be added to the batch is to be added in relatively small quantities, say under 1% there is always the possibility that some of the material would be retained on the walls of the feed chute or the walls of the mixing device. The situation is further aggravated in many situations where the major constituents are volatile, inducing wall condensation. Although such materials may be added in small quantities, it is often necessary that substantially the entire quantity be added since small variations may radically alter characteristics of the batch. For instance, in preparing rocket propellants, ferric acetylacetonate is added in a quantity of as little as 0.04% to the propellant fuel, the former serving as a curing catalyst. If as little as one ounce of ferric acetylacetonate is retained in the feed chute or on the walls of the vessel in preparing a one ton batch, a possible prohibitive variation in the physical properties of the final propellant grain will be obtained. Therefore, a method is needed whereby small quantities of material can be added to a large batch with assurance that the entire amount of the additive will be incorporated in the finished batch. Further, it is necessary to add such materials in such a manner that there is no contamination of the batch with undesired materials. Additionally, it is frequently necessary to add such materials to a batch which is being held under vacuum.

All of the above problems can be easily solved by the application of the present invention. Generally speaking, the present invention is carried out by providing a cup-like container formed from a solid material which sublimates such as solid $CO_2$. If desired, the container may be provided with a top but this is ordinarily not necessary. Cups of Dry Ice can be easily formed and will retain their integrity for a sufficient time to allow them to be used to transfer the material into a batch. When subjected to any ordinary mixing temperature for a short period of time the $CO_2$ will sublimate and will therefore not act as a contaminant for the batch.

In the case of an open mixer, no particular apparatus is necessary. The desired quantity of the constituent which is to be introduced in a small amount is merely placed in a cup of Dry Ice and the cup dropped into the mixer. In the case of those operations wherein the mixing is conducted under vacuum or pressure, some means must be provided for introducing the container without destroying the pressure or vacuum of the mixer. The sole figure of the drawing is a sectional view of one suitable apparatus for carrying out the invention under vacuum or pressure.

Referring to the drawing by reference characters, there is shown a portion of a mixing chamber having a top wall 1 with an open head 3 thereon. Attached to the head 3 is a tube 5 of a suitable construction material. The tube is preferably surrounded by insulation material 7. The normally open end of the tube 5 is provided with a cover 9 which may be hinged as at 11 and provided with a cover clamping means 13. Near the bottom of the tube 5 there is provided a gate 15 which may be actuated by a pneumatic cylinder 17 acting through a piston rod 19 which passes through a pressure gland 21. The gate 15 is provided with one or more openings 23 to equalize pressure.

Before the mixing operation is started, one or more cuplike containers 25 of Dry Ice containing the desired additive 27 are placed in the tube 5 and the closure 9 fastened in place. The mixing operation is then started and at the desired time the gate 5 is withdrawn by the cylinder 17 allowing the containers 25 together with their contents to fall into the batch with the assurance that all of the material will find its way into the batch.

I claim:
The process of adding a relatively small quantity of a material to a relatively large batch of material, said large batch of material being contained in a mixer or the like having a feed chute thereon comprising:
(a) forming a cup of solid carbon dioxide;
(b) placing the small amount of material in said cup;
(c) placing the cup containing said material in the feed chute whereby said cup is suspended over the large batch of material;
(d) releasing said cup whereby said cup containing the small amount of material falls into the large batch of material;
(e) causing said solid carbon dioxide to sublimate whereby said cup leaves no contamination in the large batch of material, said cup preventing the retention of any portion of the small quantity of material on the walls of the feed chute or the mixing device.

References Cited in the file of this patent
UNITED STATES PATENTS

| | | |
|---|---|---|
| 441,536 | Cornell | Nov. 25, 1890 |
| 862,923 | Linsley | Aug. 13, 1907 |
| 1,796,133 | Webber | Mar. 10, 1931 |
| 2,033,586 | Noble | Mar. 10, 1936 |
| 2,444,424 | Brown et al. | July 6, 1948 |
| 2,526,683 | Murphy | Oct. 24, 1950 |
| 2,539,395 | Banks | Jan. 30, 1951 |
| 2,539,457 | Metheney et al. | Jan. 30, 1951 |
| 2,636,007 | Jurgensen et al. | Apr. 21, 1953 |
| 2,636,008 | Jurgensen et al. | Apr. 21, 1953 |
| 2,694,641 | Atwood et al. | Nov. 16, 1954 |

FOREIGN PATENTS

| | | |
|---|---|---|
| 717,461 | Germany | Feb. 14, 1942 |